United States Patent [19]

Eberle

[11] Patent Number: 5,167,786

[45] Date of Patent: Dec. 1, 1992

[54] WAVE-POWER COLLECTION APPARATUS

[76] Inventor: William J. Eberle, 102 Oak Forrest Trail, Euless, Tex. 76039

[21] Appl. No.: 646,353

[22] Filed: Jan. 25, 1991

[51] Int. Cl.$^5$ .......................... C25B 1/10; C25B 1/12; C25B 9/00; C25B 15/02
[52] U.S. Cl. .................................. 204/229; 204/242; 204/264; 204/266
[58] Field of Search .................. 204/129, 275–278, 204/263–266, 229, 242; 210/242.1, 170

[56] References Cited

U.S. PATENT DOCUMENTS

| | | |
|---|---|---|
| 242,233 | 5/1881 | Swales . |
| 321,229 | 6/1885 | Leavitt . |
| 366,768 | 6/1887 | Elias . |
| 581,067 | 4/1897 | Fletcher . |
| 706,620 | 8/1902 | Williams . |
| 739,538 | 9/1903 | Fredson . |
| 787,182 | 4/1905 | Huchings . |
| 791,366 | 5/1905 | Rapp . |
| 852,232 | 4/1907 | Kohler . |
| 879,992 | 2/1908 | Wilson . |
| 884,080 | 4/1908 | Fallis . |
| 975,157 | 11/1910 | Quedens . |
| 1,377,163 | 5/1921 | Pool ..................... 60/497 |
| 1,389,445 | 8/1921 | Hare . |
| 1,403,702 | 1/1922 | Melvin . |
| 1,471,222 | 10/1923 | Taylor . |
| 1,623,341 | 4/1927 | Hare . |
| 1,647,025 | 10/1927 | Stich . |
| 2,668,918 | 2/1954 | Howell . |
| 2,706,077 | 4/1955 | Searcy ............... 230/67 |
| 2,749,085 | 6/1956 | Searcy ............... 253/10 |
| 3,060,119 | 10/1962 | Carpenter ........... 210/242.1 X |
| 3,487,228 | 12/1969 | Kriegel et al. ......... 290/52 |
| 3,652,431 | 3/1972 | Reynolds ............ 204/129 |
| 4,125,463 | 11/1978 | Chenoweth ........ 210/170 X |
| 4,206,601 | 6/1980 | Eberle ................ 60/398 |
| 4,235,693 | 11/1980 | Rowe et al. ......... 204/129 X |
| 4,335,576 | 6/1982 | Hopfe ................. 210/242.1 X |
| 4,452,696 | 6/1984 | Lopez ................. 210/242.1 X |
| 4,490,232 | 12/1984 | Lapeyre .............. 204/278 |

Primary Examiner—Donald R. Valentine
Attorney, Agent, or Firm—Woodcock Washburn Kurtz Mackiewicz & Norris

[57] ABSTRACT

A novel tidal and wave-power collection apparatus is disclosed which is adapted to produce hydrogen and/or oxygen gas. The apparatus is particularly well suited for oceanic installations. In the preferred embodiment, a matrix of gas producing units is easily assembled at sea, each being bridged and reinforced by catwalks extending therebetween which form trilateral gas producing modules having such units at each of the corners thereof. Each gas producing unit comprises a central tubular pilaster embedded in the ocean floor around which is disposed a toroidal float which moves up and down with the waves and tide and which acts to drive a DC generator while rising and falling. The output of the generator is utilized to electrolytically produce hydrogen and/or oxygen gas, which is compressed for storage in the float's chamber. The apparatus is efficient, economical and capable of capturing and storing large quantities of gas. In an alternative embodiment, the DC generator drives a high pressure pump which forces sea water through the microporous membrane of a reverse osmosis unit, thereby converting the sea water into potable water.

18 Claims, 8 Drawing Sheets

WAVE-POWER COLLECTION APPARATUS

CROSS-REFERENCE TO RELATED PATENT

The present application is related to my prior U.S. Pat. No. 4,206,601, dated Jun. 10, 1980, which patent is hereby incorporated by reference as if fully set forth herein.

BACKGROUND OF THE INVENTION

It has long been recognized that waves and/or tidal forces contain tremendous amounts of potential energy which, if harnessed, could not only supply substantial power but might also, if appropriately installed, protect large areas of shore line from the ravages of oceanic erosion.

In the prior art, extensive patent literature exists dealing with the subject of "wave motors" and relating to various ways of utilizing floats which rise and fall with passing waves, the movement of the floats being translated by various means into mechanical energy, and then into electrical energy. For example, U.S. Pat. Nos. 321,229 and 1,647,025 disclose compressed air storage in combination with a wave motor. U.S. Pat. No. 2,706,077 is titled "Ocean Wave Air Compressor". Other forms of energy storing means are known to this art, including means utilizing balance wheels or flywheels in combination with various mechanisms for supplying power from waves. Additionally, the art teaches the use of multiple pontoons, or floats, the floats being arranged in various ways for improving the continuity of power derived from the passing waves, while occasionally also showing means for deriving energy from the lateral motion of waves as well as from the up and down motion of waves. In these regards, please refer to U.S. Pat. Nos. 242,233; 321,229; 366,768; 581,067; 706,620; 739,538; 787,182; 791,366; 852,232; 884,080; 879,992; 975,157; 1,377,163; 1,389,445; 1,403,702; 1,471,222; 1,623,341; 1,647,025; 2,668,918; 2,706,077; 2,749,085 and 3,487,228.

While many of the devices disclosed in the prior art are no doubt operative, the failure of such devices to gain widespread acceptance suggests that these devices may, in practice, be too expensive, complex, and difficult to maintain to serve as practical energy sources.

SUMMARY OF THE INVENTION

The present invention overcomes many of the disadvantages of the prior art by providing an extremely simple, economical device for capturing substantial amounts of energy and converting that energy into hydrogen and/or compressed oxygen which is stored within the floats of each power unit. These gas(es) may then be collected, or supplied through conduits, as needed, to satisfy energy and or raw material demands.

Applicant has recognized that a drawback of prior art wave power collection devices is the inability to collect and store large amounts of energy. The present invention takes advantage of the ocean's plentiful supply of highly conductive sea water to serve as a reservoir for the electrolytic production of hydrogen, and if desired, oxygen, gas. Production of hydrogen gas in large quantities is particularly timely, since that gas is currently in high demand as an alternate, non-polluting fuel source for automobiles.

The preferred embodiment device of the present invention comprises a plurality of tubular members which have been designed to facilitate on site "at sea" assembly Each of the power collection units comprises a central, substantially cylindrical pilaster around which a toroidal (donut-shaped) float is trackingly mounted. One end of the cylindrical pilaster is embedded in the ocean floor and the pilaster extends vertically through the water to protrude some distance above the highest expected high water line. Each pilaster is interconnected to at least two adjacent pilasters by tubular bridging members which serve to reinforce the pilasters, to house high pressure conduits, and to act as pedestrian catwalks to facilitate servicing of each energy collection unit. In the preferred embodiment, the floats are manufactured in accurate tubular sections which have flanges formed thereon which, upon assembly, create high pressure seals between sections to define a gas chamber within the float. Portions of these flanges additionally act in combination with axles mounted therebetween to position wheels which track up and down the outside surface of the pilaster. Portions of these flanges also act as attachment sites for several rack and pinion drives which power a drive shaft in response to the ascension and descension of the float with respect to the pilaster. The drive shaft drives a DC generator which is connected to electrodes located in a hollow well formed in the core of the tubular support member. This well, which is in liquid communication with the surrounding ocean, is partially filled with sea water which totally submerse the electrodes. Baffles and appropriate separators separate the electrodes so that the gases generated in the vicinity of each may be separately collected, or separately vented to the atmosphere, as desired. A compressor, driven either manually by the drive shaft or electrically by the output of the generator, compresses at least hydrogen gas drawn from the appropriate, hydrogen containing chamber of the well headspace, for transmission and storage in the toroidal floats.

In an alternative embodiment of the invention, the DC generator drives a high pressure pump which forces sea water through the microporous membrane of a reverse osmosis unit, thereby converting the sea water into potable water.

As seen from the above, a primary object of the present invention is the provision of a superior tidal and wave-power collection apparatus which is easily assembled and installed at sea.

Another object of the present invention is the provision of such an apparatus which may produce, store, and supply substantial amounts of hydrogen and/or oxygen gas(es) which has been captured by electrolytic conversion of tidal and wave energy.

Still another object of the present invention is the provision of such an apparatus which may produce potable water from sea water using the tidal and wave energy collected.

These and other objects of the present invention will become apparent from the following more detailed description.

DESCRIPTION OF THE PREFERRED EMBODIMENTS

Figure 1:
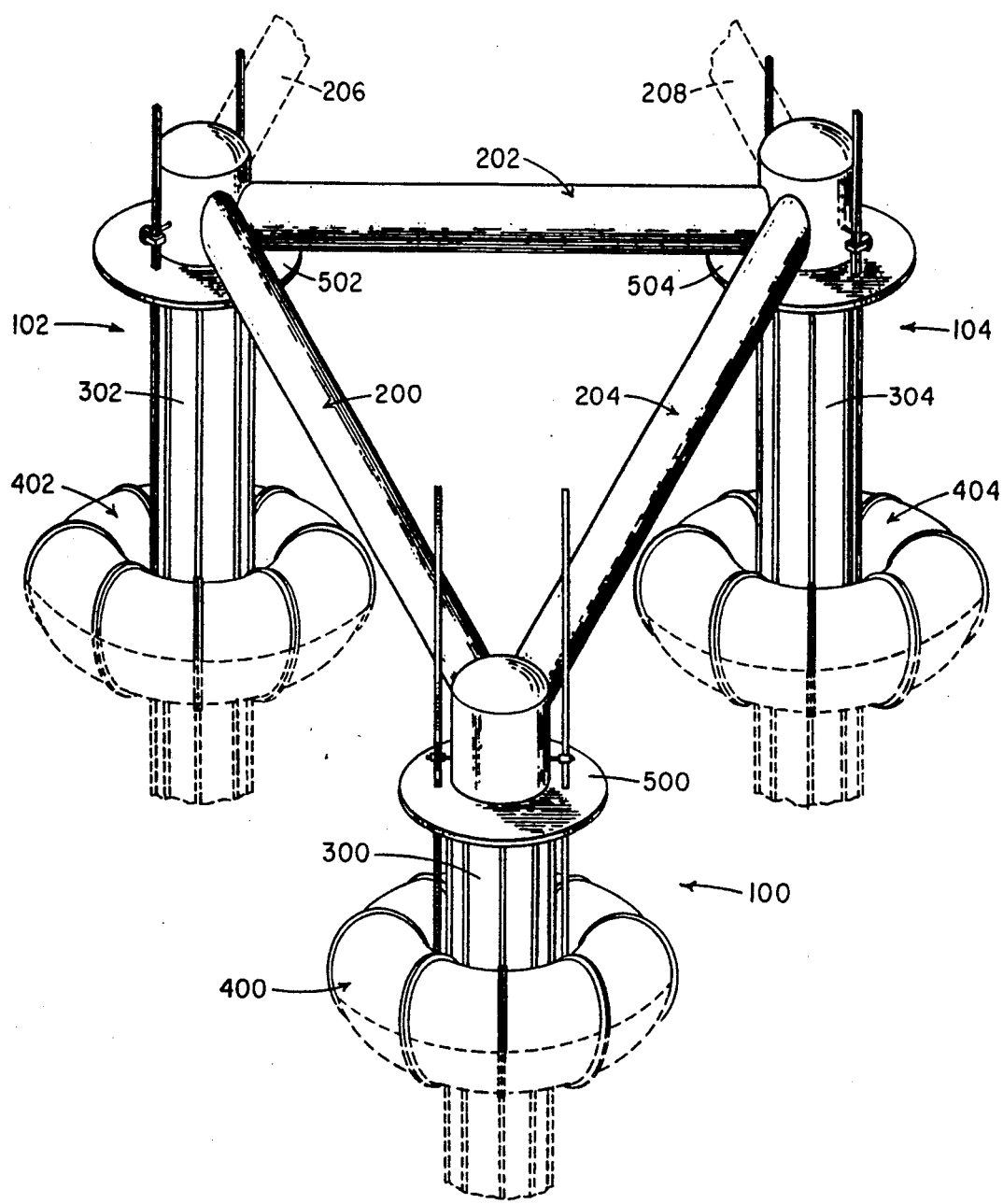
FIG. 1 is an isometric view of a single power collection module having three preferred embodiment power collection units disposed at the corners thereof, connections to other unit(s) and portions of each unit disposed below the water line being represented in phantom.

Although specific forms of the invention have been selected for illustration in the drawings, and the following description is drawn in specific terms for the purpose of describing these forms of the invention, this description is not intended to limit the scope of the invention which is defined in the appended claims.

Referring now to the figures, and particularly FIG. 1, the preferred embodiment wave power collection apparatus should be installed in a relatively large body of water for converting wave and tidal energy into high pressure compressed air. The preferred embodiment apparatus further is capable of collecting and storing air in the apparatus, and for transmitting the compressed air to a preselected consumption site. The preferred embodiment apparatus generally comprises a plurality of power collection units which are structurally interconnected by bridging means for rigidly connecting the power collection means to create a rigid connection module. In the preferred embodiment, at least three power collection units are interconnected to form a trilateral power collection module which is capable of withstanding any lateral forces which might be applied there against by ocean currents or winds In FIG. 1, power collection units designated generally 100, 102, and 104 are illustrated which are interconnected by bridging members designated generally 200, 202, and 204. Each power collection unit comprises a central pilaster, such as pilasters 300, 302, and 304 which are substantially cylindrical structures which are driven into the sea bed or floor and which extend as shown in FIG. 1 for a preselected distance above the expected high water mark for a given location. Floats designated generally 400, 402, and 404 are trackingly mounted for substantially vertical movement up and down their respective pilasters, such that the movement of these floats will drive rack and pinion mechanisms associated therewith to drive a fly wheel and ultimately a compressor which are disposed in the hollow upper portion of the pilaster. Compressed air produced thereby is fed into the floats 400, 402, and 404 for storage, and/or is fed into conduits which are housed in the bridging members 200, 202, and 204 for eventual transmission from unit to unit and then to a remote power consumption site.

FIG. 1 illustrates the minimum number of power collection units which may be used in a single installation. In phantom in FIG. 1, however, connections to an additional power collection unit as illustrated by the phantom bridging members 206 and 208 which may be used to interconnect this additional unit to power collection units 100 and 102 to expand the apparatus and to create therewith a second trilateral collection module. Accordingly, as power requirements increase, it is a relatively simple matter to expand the system to accommodate the needs of any particular power consumption site.

As shown particularly in FIG. 1, the bridging means, such as bridging members 200, 202, and 204, are substantially tubular and have elliptical cross-sections. In the preferred embodiment, these members are sized to act as catwalks which facilitate pedestrian movement between one power collection unit and the next. By orienting the axis of the elliptical cross-section substantially vertically, the bridging members are not only configured for easy pedestrian movement therethrough, but are also configured to permit the power collection units to be disposed at substantial distances apart, yet be spanned by relatively simple bridging structures. Finally, due to the enclosed nature of the catwalks maintenance workers servicing the power modules are well protected from the environment.

In order to limit the maximum vertical travel of each of the floats in an upward direction and also to provide a deck for use in servicing various portions of the apparatus, a substantially planar, annular deck is provided such as decks 500, 502, and 504. During assembly these decks may act to temporarily support the bridging members prior to their permanent attachment to the pilasters.

Figure 2:
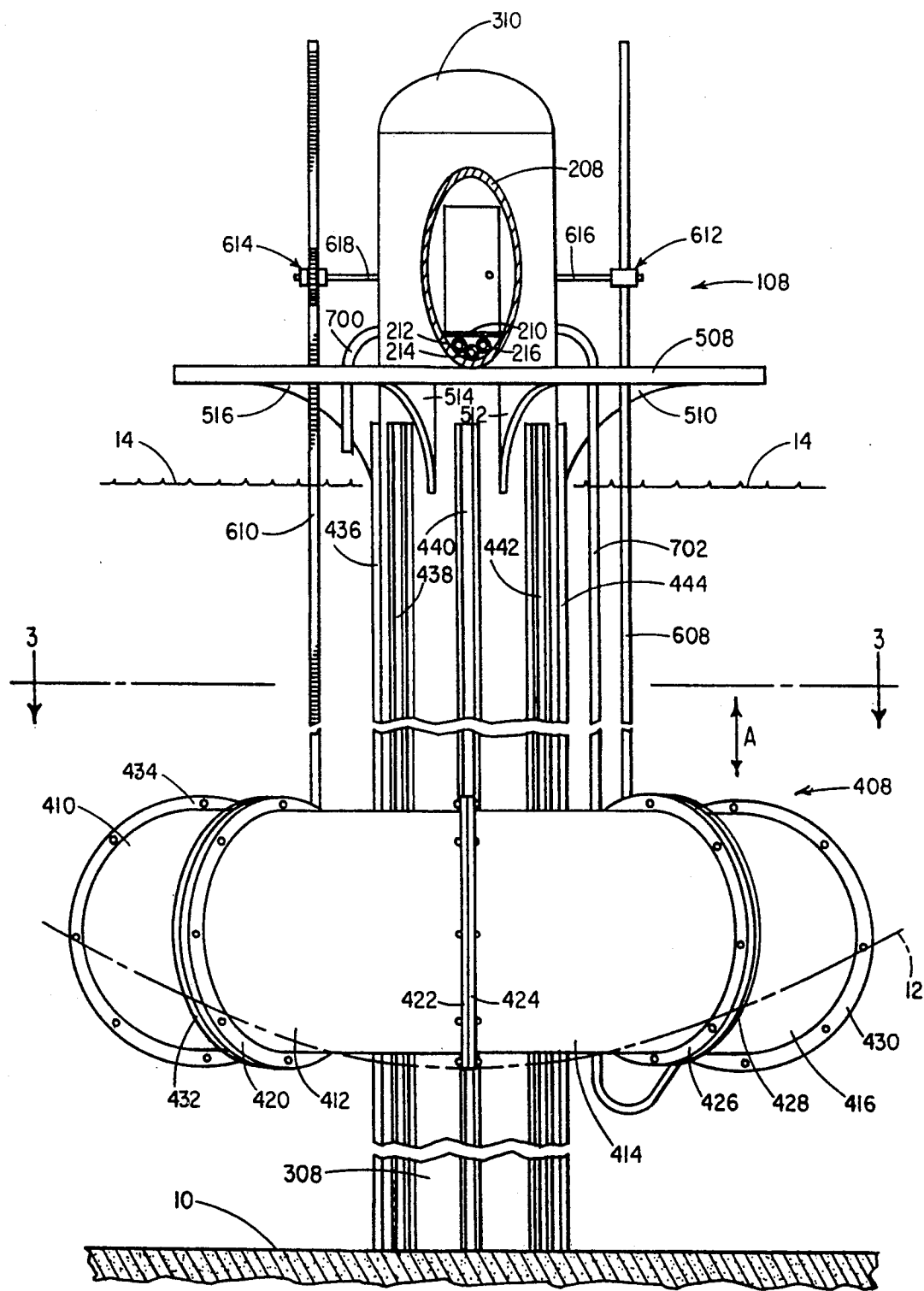
FIG. 2 is a front view on an enlarged scale of a power collection unit similar to that illustrated in FIG. 1, the height of which has been foreshortened for purposes of illustration, and portions of an elliptical tubular bridging member and high pressure transmission conduits being shown in cross-section.

The float 408 is seen in FIG. 2 to encircle the pilaster and to be trackingly mounted with respect thereto for movement in response to variations in water level, that is, so that the float may travel in directions which are substantially parallel to the axis of the pilaster. The float itself comprises a plurality of float sections, such as float sections 410–417. Each of these sections is preferably identical to the other. At either end of each section are outwardly depending flanges, such as outwardly depending flanges 420 and 422 for section 412; 424 and 426 for section 414; 428 and 430 for section 416; and 432 and 434 for section 410. As shown particularly in FIGS. 2 and 3, these outwardly depending flanges are complementally configured to bolt to the outwardly extending flanges of the adjacent float sections to thereby form a high pressure seal therebetween, and to create a compression chamber within the float which is not only water tight so that the float will not become swamped with water which might otherwise seep between the flanges, but also gas-tight to contain compressed air within the float so that the float may act as a compressed air reservoir. In order to stabilize and guide the movement of the float 408 a plurality of tracks, such as tracks 436–442 and 444 are applied to the exterior surface of pilaster 308, one for each intersection between adjacent float sections, which tracks receive and guide wheels (two for each track) generally disposed between the float 408 and the pilaster 308, as illustrated particularly in FIG. 4. In FIG. 2 the water level, indicated by line 12, is shown buoying the float 408 in a relatively low position with respect to the pilaster and other equipment mounted thereon. Attached to various places on the float are a plurality of racks, such as racks 608 and 610 which are pivotally connected at one end to portions of the float 408. These racks extend through openings in the deck 508 and engage pinion assemblies designated generally 612 and 614 which are oscillated in opposite rotational directions in response to the up and down movement of the racks 608 and 610. This rack movement is produced by movement of float 408 in the directions illustrated by double ended arrow A. The pinion assemblies 612 and 614 are mounted on remote ends of clutched drive shafts 616 and 618.

A fluid intake conduit for supplying fluids to the air compressor located within the upper portion of the pilaster extends through an opening in deck 508 downwardly to a point between the highest expected high water line 14 and the undersurface of the deck 508. By orienting the fluid intake means in this position, the fluid intake will normally supply air to the compressor but will be under water in the event that the expected high water mark is exceeded, as for example under hurricane conditions. In this event, weather conditions may be so severe that protection of the apparatus from destruction by such forces may become a matter of primary importance. Accordingly, the fluid intake conduit 700 will, under these conditions, supply sea water to the compressor. Since the output of the compressor communicates through output conduit 702 with the interior of the float 408, water introduced through the fluid intake conduit will be channeled through output conduit 702 into the interior of the float, causing the compressor to act as a liquid pump, thereby lowering the float in the water and lowering the center of gravity of the apparatus. Depending upon the ferocity of the storm, the float will eventually settle down the pilaster until caused to stop at an appropriate position below the water's surface, yet at a position which is readily retrievable once weather conditions have improved. Assuming the float is not completely swamped (in which case auxiliary bilge pumps may become necessary), by reversing the compressor (and by providing negative pressure valves in the interior of the float chamber) the compressor may automatically pump out the interior of a float, discharging the sea water through fluid intake means 700 to reestablish the float as a gas filled chamber.

FIG. 2 has been taken so that a portion of the bridging means 208 connecting it with an adjacent power collection unit is shown in cross-section, and will be seen to have a floor 210 under which are disposed a plurality of high pressure compressed air transmission conduits 212, 214, and 216.

Figure 3:
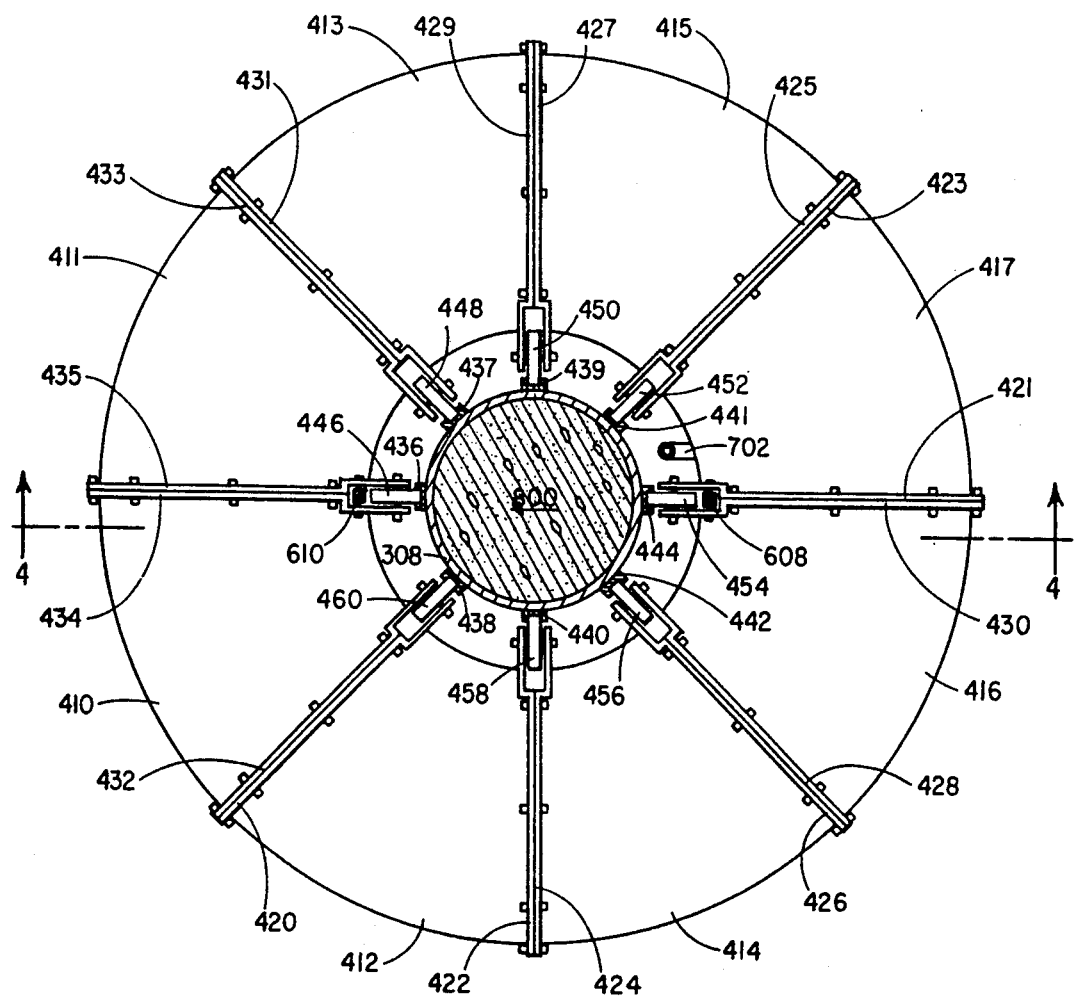
FIG. 3 is a cross-sectional top view of the embodiment illustrated in FIG. 2 taken as indicated by the lines and arrows 3—3 in FIG. 2.

Referring now in particular to FIG. 3, which is a cross-sectional top view of the apparatus shown in FIG. 2, the interrelationship between the toroidal float 408 and pilaster 308 is clearly illustrated. In FIG. 3 toroid sections 410, 411, 412, 413, 414, 415, 416, and 417 are illustrated as are outwardly depending flanges 420–435. As seen particularly in FIG. 3, these flanges mate with complemental flanges of adjacent sections for almost their entire length, however, the portions thereof which are disposed toward the toroid's center are differentiated into spaced apart flange portions which act as an axle mounting assemblies for wheels 446, 448, 450, 452, 454, 456, 458, and 460 which move along tracks 436, 437, 439, 441, 444, 442, 440, and 448 respectively. Ballast 800 is provided in the center of the pilaster in order to weight the entire unit and increase both its strength and ability to withstand the tendency of ocean currents etc. to displace the unit.

Figure 4:
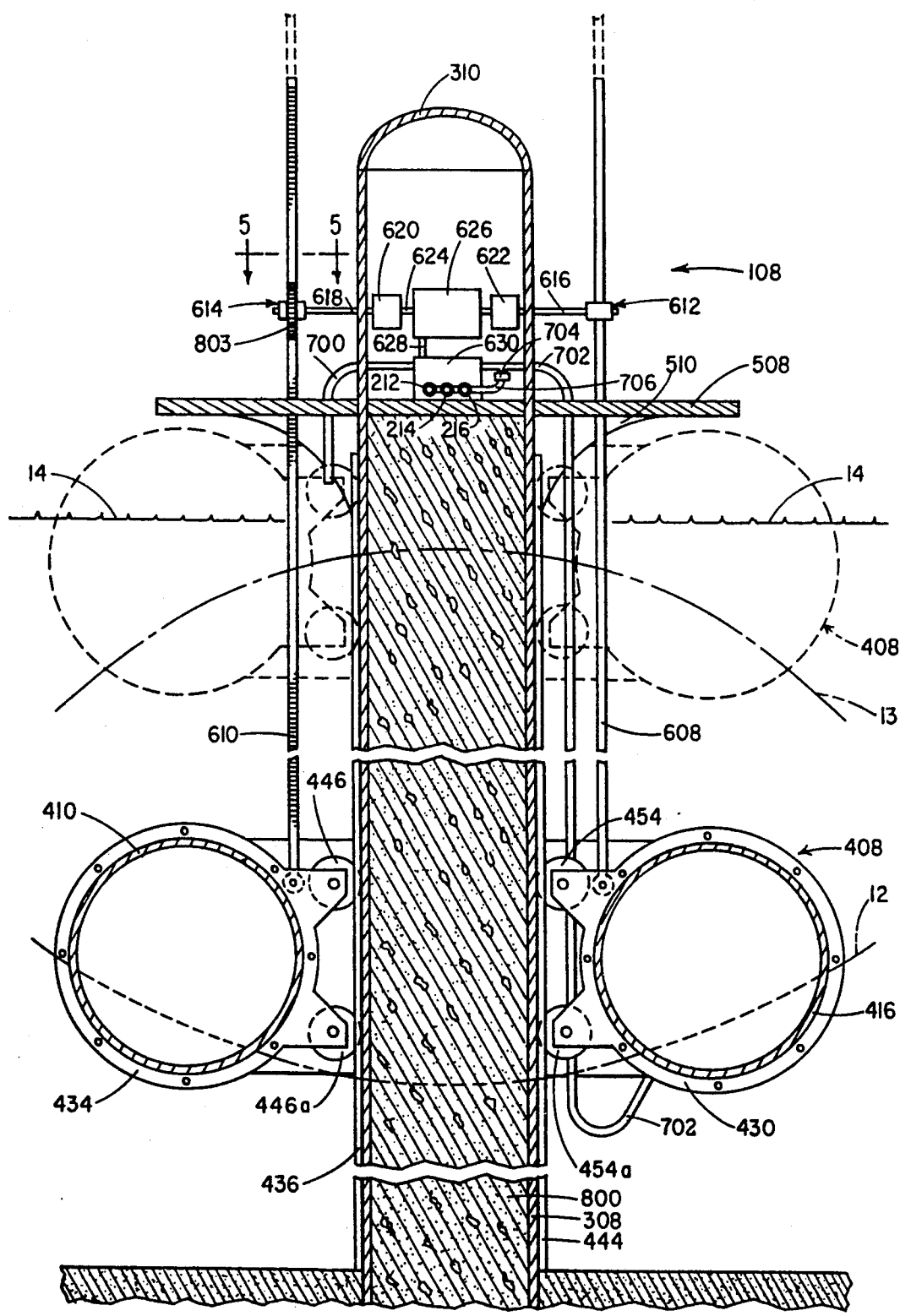
FIG. 4 is a cross-section of the embodiment shown in FIG. 2 taken as indicated by the lines and arrows 4—4 in FIG. 3.

Referring now in particular to FIG. 4, many of the features discussed above with reference to the other figures are also illustrated in FIG. 4. Additionally, FIG. 4, which is a cross-section of the power collection unit shown in FIGS. 2 and 3, depicts the machinery disposed within the upper hollow portion of pilaster 308, as well as additional wheel mounting and float details. In particular, clutched drive shafts 616 and 618 extend inwardly from pinion assemblies 612 and 614 to pass through openings in the pilasters to engage unidirectional clutches 620 and 622. Since the tracks 608 and 610 are disposed on opposite sides of their respective pinion assemblies, both of these clutches may be either clockwise or counter-clockwise clutches so that one of the racks, such as rack 610 will act through pinion assembly 614, drive shaft 618, and clutch 620 to drive the main drive shaft 624 in a preferred rotational direction in response to the ascension of the float, while the other rack, rack 608, will act through pinion assembly 612, clutch drive shaft 616, and clutch 622 to continue driving the main drive shaft in that direction during the descension of the float. The clutches 620 and 622 allow their respective clutch shafts to idle with respect to the drive shaft upon the return strokes of the racks. A flywheel 626 is diagrammatically illustrated disposed on main drive shaft 624, and a belt or other drive means 628 is shown spanning between the flywheel and compressor 630 so that the compressor is continuously driven by the flywheel and main drive shaft even though the power supplied thereto by either of the racks is discontinuous.

The output of compressor 630 is connected to output conduit 702 and also through a ball check valve 704 to transmission supply conduit 706. The ball check valve prevents any water which might enter the system from inadvertently being introduced into transmission conduits 212, 214 or 216, and additionally seals off those transmission conduits when the gas pressure within conduit 702 is less than the pressure within conduit 706.

FIG. 4 additionally shows the relative vertical orientations of each wheel set, such as wheel set 446 and 446a and wheel set 454 and 454a, which wheel sets are spaced apart and vertically aligned to move within a single pilaster track. By mounting two vertically spaced apart wheels between opposing flange portions from each of the sections, any tendency of the float to twist with respect to the pilaster is effectively resisted.

FIG. 4 also shows the pivotal attachment of racks 608 and 610 between opposing portions of flanges 430 and 421 for rack 608 and 434 and 435 for rack 610. An aperture formed at the float end of each rack is sized to receive a rod extending between these opposing flange portions. Since the rack aperture is somewhat oversized, some lateral play is accordingly created between the racks and the float.

In FIG. 4, the float is shown in its solid lined position buoyed by water level 12 which represents a wave or tidal trough, whereas the float 408 is shown in dotted outline buoyed to a greater nearly maximum height with respect to the pilaster on a wave or tidal crest, as indicated by phantom water level height 13. It should be noted in FIG. 4 that the height of the apparatus illustrated in FIG. 4 has been foreshortened in several places. While the deck 508 is designed to resist any forces which might be applied thereto by interference with the float 408, as described hereinabove, the height of the pilaster should not be made so short that the travel of the float is unduly limited by the deck position, but rather under most weather conditions the float should be free to move between its crest and trough positions. At the same time, by designing the apparatus with reference to an expected high water mark and by providing the preferred embodiment apparatus with various means for withstanding occasional water heights which may be substantially higher than the maximum expected high water line, expenditures for unduly high pilasters and other mechanisms which might otherwise be used only very infrequently are avoided.

Figure 5:
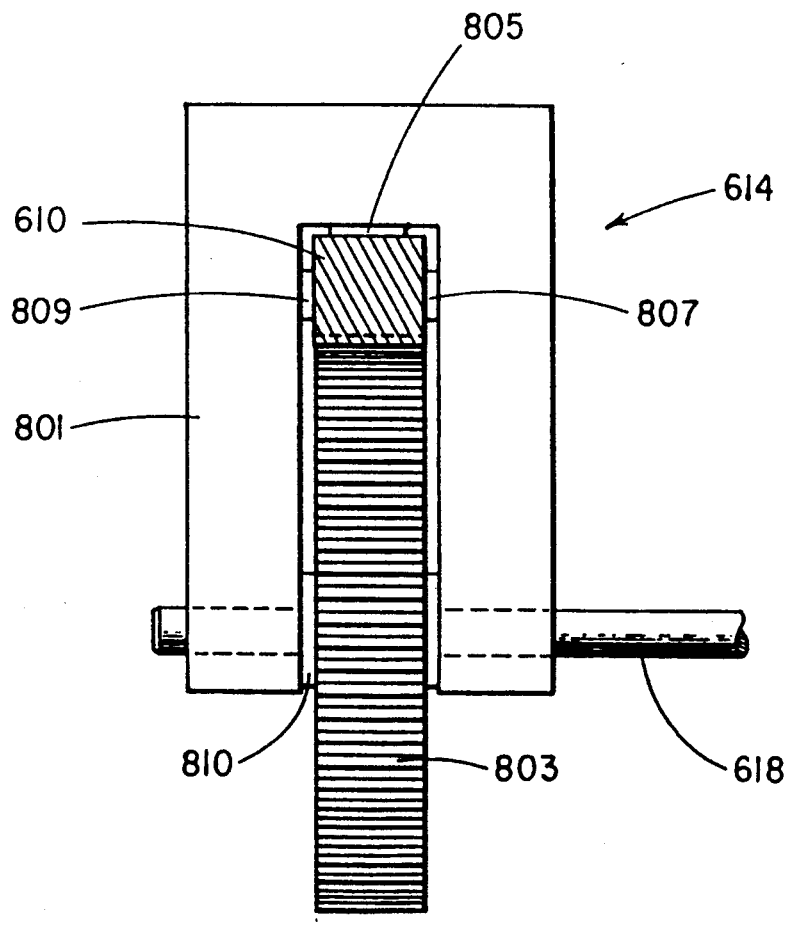
FIG. 5 is a cross-sectional top view on a greatly enlarged scale of a portion of the embodiment shown in FIG. 4 taken as indicated by the lines and arrows 5—5, in FIG. 4.

In FIG. 5, which is a top cross-sectional view on a greatly enlarged scale, the details of the pinion assembly designated generally 614 is illustrated. The pinion assembly is seen to comprise a substantially U-shaped rack follower assembly sol, the ends of which are journalled on the end of clutched drive shaft 618. A main drive gear 803 is attached to shaft 618 and is positioned between the two arms of the rack follower assembly. The rack 610, which is shown in cross-section in FIG. 5, is journalled between main drive gear 803 and bearings 805, 807, and 809 which are mounted on the inner surfaces of the rack follower assembly near the interior base of the "U". These bearings preferably are biased towards the rack yet provide enough forgiveness to prevent undue stress on the rack member. Similar bearings 810 are provided between the main drive gear 803 and the interior surfaces of the arms of the rack follower assembly 801 so that the movement of the rack 610 will ride smoothly so that axial movement of the rack 610 with respect to the main drive gear will produce a positive rotational driving of clutched shaft 618. Although not illustrated in the drawings, according to one embodiment of the present invention, a unidirectional clutch may be incorporated between the main drive gear 803 and the shaft on which it is mounted. In this instance, the main drive shaft 624 would extend substantially through the pinion assemblies, with the unidirectional clutching action taking place within those assemblies. It is also within the scope of the present invention, if desired, to provide additional bearing means at various places along the clutched and main drive shafts to further stabilize the pinion, flywheel, and clutched assemblies.

Figure 6:
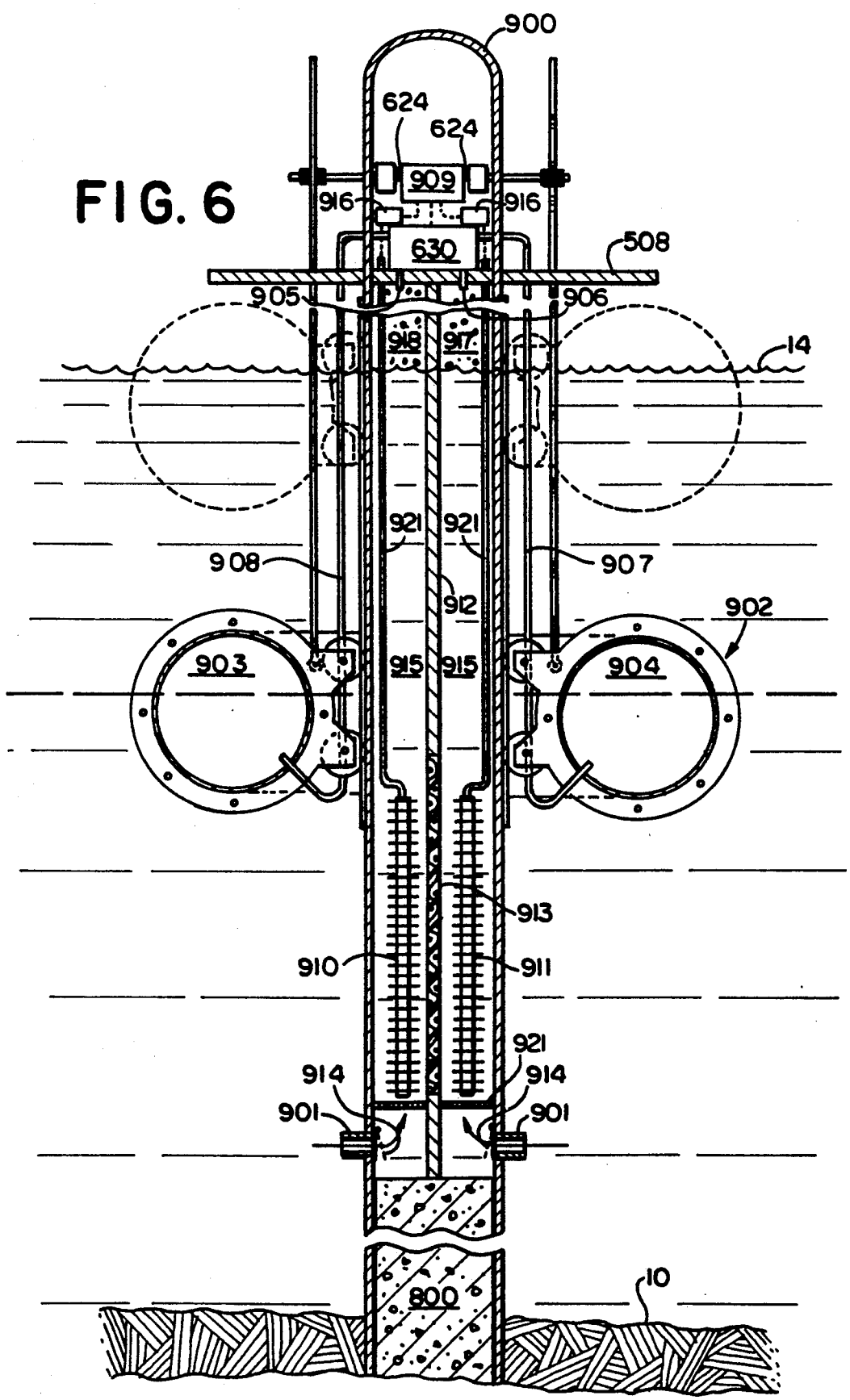
FIG. 6 is a cross-section showing a first alternate embodiment of the invention shown in FIG. 4.

In FIG. 6, a first alternate embodiment of the invention is shown. In this embodiment a pilaster 900, driven into the sea floor 10, extends a preselected distance above the expected high water line 14, as before. However, in this embodiment, ballast 800 is provided in only the lower portion of the pilaster 900 so that a hollow well 915 is formed within the pilaster above the ballast. A plurality of apertures 901 are disposed in the pilaster 900 below the low water line 920 so as to allow water to enter the well 915 through flapper type check valves 914. A filter 921, which may be a stainless steel strainer, removes debris from the water entering into the well 915 through apertures 901. Two finned electrodes 910 and 911, which may be of the type commonly used in lead batteries, are disposed in the well 915 below the low water line 920. The electrodes 910 and 911 are oppositely charged so that an electrical potential is created between them, causing current to flow through the water between the electrodes. As a result of this current, a portion of the water dissociates into hydrogen and oxygen molecules by an electrolysis process, the hydrogen molecules forming on the cathode electrode 910 and the oxygen molecules forming on the anode electrode 911.

A microporous barrier 913, which may be of the type commonly used as battery separators, is mounted in the pilaster 900 between the electrodes 910 and 911. The microporous barrier 913 allows the water to pass freely across it but is impervious to gases. Thus, the microporous barrier 913 ensures that the hydrogen and oxygen molecules which form on the electrodes 910 and 911 remain separated.

After dissociation, the hydrogen and oxygen molecules form bubbles which rise through the water and collect in a headspace formed between the water level and the deck 508. A baffle 912 is disposed above, and is contiguous with, the microporous barrier 913 and divides the headspace into two portions 917 and 918 so that the hydrogen and oxygen remain separate as they collect in the headspace 917, 918. From the headspace, the hydrogen and oxygen are drawn into a compressor 630 for compression therein. The compressor 630 is disposed on the deck 508 above the headspace and the hydrogen and oxygen enter the compressor 630 through intake conduits 906 and 905, respectively, which extend through the deck. The compressed hydrogen and oxygen from the compressor 630 are directed, via conduits 907 and 908, respectively, to the float 902 for storage. In the float 902, the oxygen and hydrogen are stored in separate portions 903 and 904, respectively, formed in the float by two vertically extending baffles (not shown) disposed within two of the torus sections.

Alternatively, if it were deemed undesirable or uneconomical to store both the hydrogen and the oxygen produced, the oxygen could be vented to atmosphere, rather than drawn into the compressor 630 as shown in FIG. 6. In this case, the aforementioned baffles would be unnecessary and the entire volume within the float could be utilized for the storage of hydrogen.

In any event, after being stored in the floats, the hydrogen/oxygen gas is fed into conduits housed in the bridging members 200, 202 and 204, shown in FIG. 1, for eventual transmission from unit to unit and then to a remote consumption site, as was done with the compressed air produced by the embodiment shown in FIG. 4.

In the embodiment shown in FIG. 6, the float 902 drives the drive shaft 624 through the rack and pinion arrangement, as previously discussed. Although in this embodiment the compressor 630 could be mechanically driven via the fly wheel, as before, in the preferred arrangement, the drive shaft 624 turns a D.C. generator 909 which provides electrical power to drive the compressor 630. The generator 909 is also electrically connected to the electrodes 910 and 911 via bus bars 923 so as to create the aforementioned electrical potential.

With respect to the energy which can be produced by the generator 909, as driven by the oscillations of the float 902 due to wave action, it should be noted that the energy flux in an incident wave can be approximated by the equation:

$$E_f = \rho g H^2 L \left[(1+2kh)/\sinh(2kh)\right]/16T \tag{1}$$

where
$E_f$ = energy flux per unit wave crest width
$\rho$ = density of water
$g$ = acceleration due to gravity
$H$ = wave height
$L$ = wave length
$k$ = wavenumber, $2\rho/L$ h = depth of water
T = wave period.
Based on dispersion, the wave length L can be determined from the equation:

$$\omega^2 = gk \tanh(kh) \quad (2)$$

where $\omega$ = wave frequency, $2\pi/T$. By combining equations (1) and (2), the total power contained in an incident wave can be estimated for a given float outside diameter. For a water depth of 30 feet and a float outside diameter of 30 feet, the total power estimated for waves of various heights and periods, using the aforementioned analysis, is shown in Table 1.

TABLE 1

| Wave Height, Ft. | Wave Period, Sec. | Wave Power, kW |
|---|---|---|
| 3 | 6 | 54.8 |
| 3 | 10 | 74.4 |
| 3 | 20 | 85.8 |
| 6 | 6 | 219.2 |
| 6 | 10 | 297.6 |
| 6 | 20 | 343.2 |

It has been further estimated that the apparatus disclosed herein, taking into account the movement of the float induced by the incident wave field and the cancelling effect of the waves radiated by the float itself, is capable of extracting approximately 50% of the incident wave power. Thus, these theoretical estimates suggest that ample energy will be produced in the generator 909 to compress the gas to a relatively high pressure.

It will be appreciated that to avoid damage to the electrodes 910 and 911, they must remain submerged at all times. To this end, flapper type check valves 914 are disposed at the discharges of the apertures 901. The check valves are oriented so as to open only in the inward direction. Thus, water will enter the well 915 only when the pressure in the surrounding water is greater than that in the well. Initially, the gravity head in the surrounding water will cause the water in the well 915 to rise to the level of surrounding water. Any further rises in the level of the surrounding water will cause a similar rise in the water level in the well 915. Should the level of the surrounding water drop, the check valves will prevent the loss of water from the well 915. Thus, regardless of the action of the surrounding sea, the electrodes 910 and 911 will remain submerged except in the unlikely event that the surrounding water drops below its normal low level 920 for a sufficiently long period of time to enable the quantity of water stored in the well 915 above the electrodes to be consumed by the electrolysis process. Note that as the electrolysis progresses, the concentration of brine in the well water will increase. Therefore, it is expected that it will be necessary to periodically pump the fluid out of the well 915 to allow fresh sea water to re-enter the well.

Figure 7:
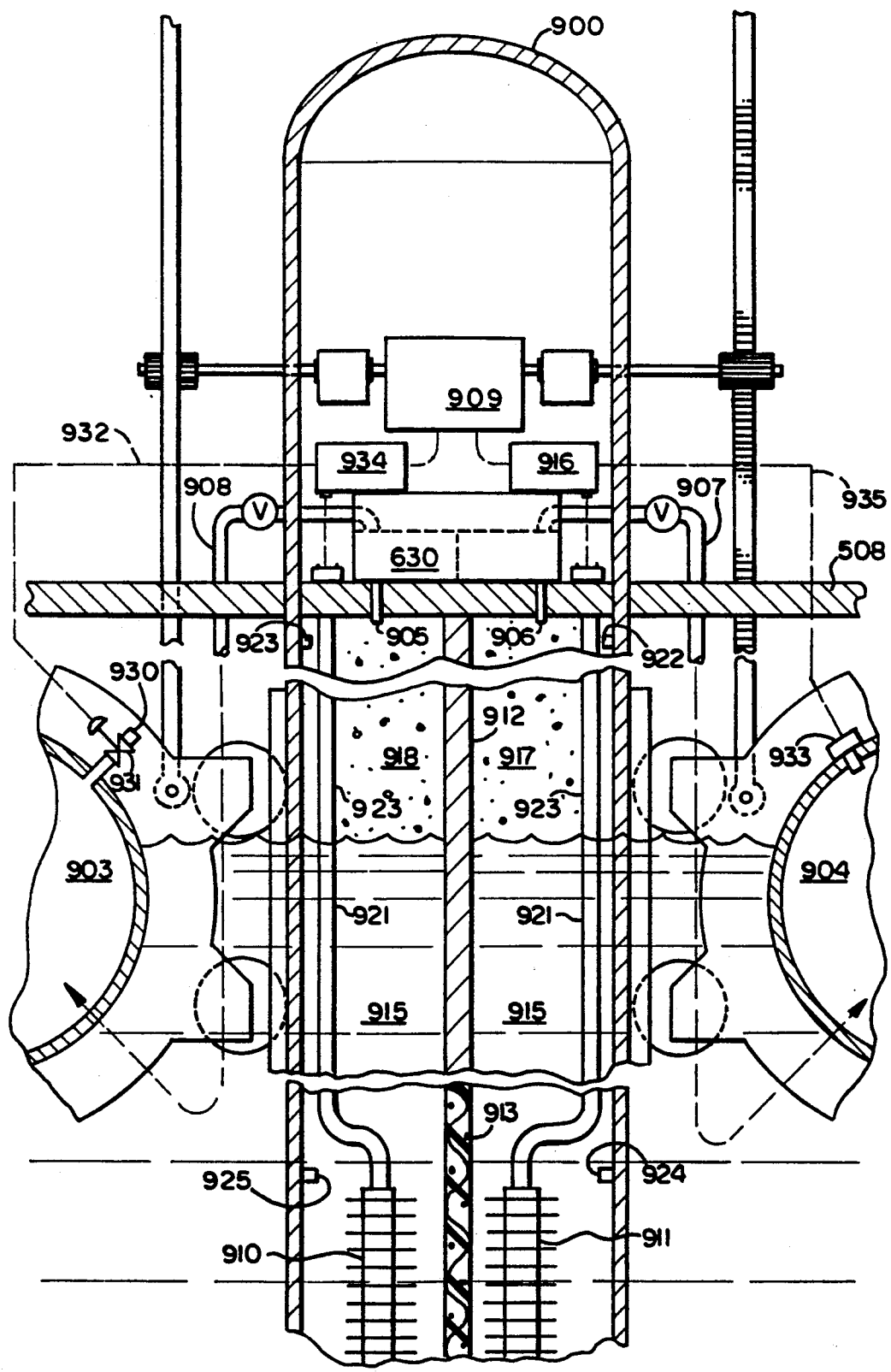
FIG. 7 is an enlarged view of the upper portion of the cross-section shown in FIG. 6.

Notwithstanding the safety features designed into the apparatus as described above, in the preferred embodiment, logic devices 916 and 934, electrically coupled to the generator 909, are utilized to ensure the reliable operation of the apparatus. As shown in FIG. 7, level sensors 924 and 925, which may be level switches of the type commonly used in boilers, are mounted in the well 915. In the event either of the level sensors 924 and 925 sense that the level of the water in the well 915 has dropped below a predetermined level—that is, the level at which they are mounted—the logic devices 916 and 934 will cut off power to the electrodes 910 and 911 to protect them from damage.

In the event of a severe storm or other unusual sea conditions, the level of the surrounding sea water may rise excessively high. Such rise in the surrounding water will cause the water level in the well 915 to rise. Accordingly, level switches 922 and 923 are also mounted in the well 915. As shown in FIGS. 7, the level switches 922 and 923 are disposed in the head space portions 917 and 918, respectively, at the level of the compressor intakes 915 and 916. The signals from the level switches 922 and 923 are directed to logic devices 916 and 934, respectively, so that the logic devices will shut down the compressor 630 should the water reach the level of the switches. Moreover, as shown in FIG. 7, a sea cock 930 is mounted in portion 903 of the float. In the event level sensors 922 and 923 indicate the aforementioned high water level, logic device 934 will actuate valve 931 installed on the sea cock 930 to flood the portion 903 of the float, thereby causing it to sink deeper into the water where it may safely ride out the storm. A second sea cock and valve (not shown) is mounted in portion 904 of the float and is actuated in a similar fashion by logic device 916.

As shown in FIG. 7, a pressure sensor 933, which may be a transducer, is installed in portion 904 of the float 902 to measure the pressure therein. Electrical line 935 transmits the signal from the pressure sensor 933 to the logic device 916. Should the pressure of the hydrogen in portion 904 exceed a predetermined level, logic device 916 will shut down the compressor. A similar pressure sensor (not shown) is installed in portion 903 of the float and transmits its signal to logic device 934 for similar protection against oxygen over pressure.

Figure 8:
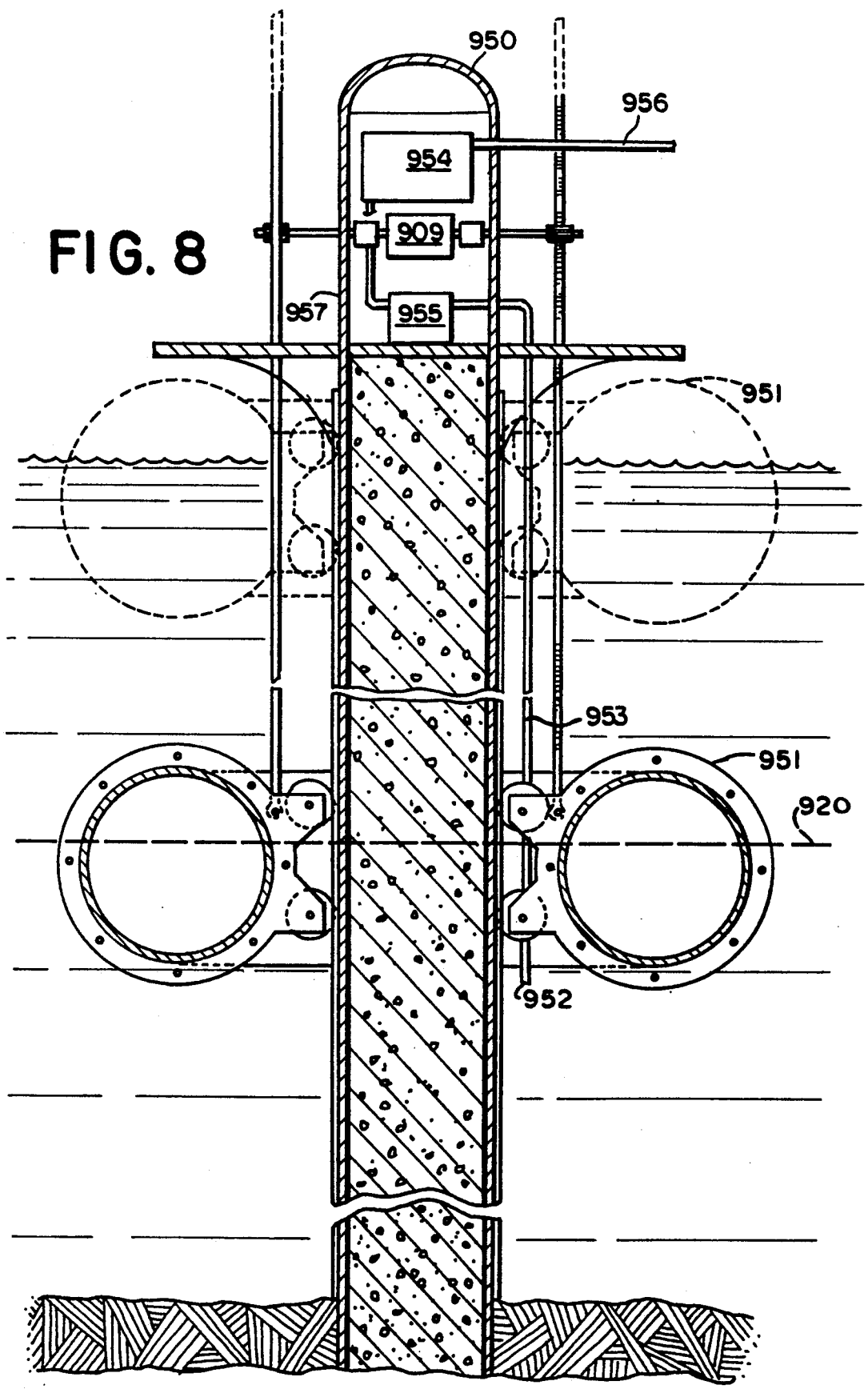
FIG. 8 is a cross-section showing a second alternate embodiment of the invention shown in FIG. 4.

FIG. 8 shows a second alternate embodiment of the invention shown in FIG. 4. In this embodiment, the float 951 powers a high pressure pump 955 via the generator 909 discussed with respect to the embodiment shown in FIG. 6. Alternatively, the pump 955 could be mechanically driven via the flywheel 626 discussed with respect to the embodiment shown in FIG. 4. In either case, the pump 955 draws in sea water through intake conduit 953 having an inlet 952 disposed well below the low water line 920. Pump 955 directs the sea water, via conduit 957, to a reverse osmosis unit 954, thereby producing potable water which is then transported to a consumption or storage site through discharge conduit 956 The reverse osmosis unit 954 may be of the microporous membrane type, relying on the pump 955 to force the water through the membrane.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and is not intended to limit the scope of the invention described and claimed herein.

What is claimed is:

1. A wave-power collection apparatus for installation in a body of water for converting wave energy into at least hydrogen gas and for at least collecting said gas in said apparatus, comprising:
  (a) pilaster means located extending to protrude for a preselected distance above the high water line of said body of water;
  (b) float means trackingly mounted for movement along said pilaster means in response to tidal and wave motion;
  (c) generating means mounted on said pilaster, for generating current from the movement of said float means;
  (d) electrolysis means electrically connected to said generating means, and in liquid communication with said body of water, said electrolysis means generating hydrogen and oxygen utilizing said current generated by said generating means, said electrolysis means comprising at least two opposingly charged electrodes;
  (e) gas separation means mounted on said pilaster means generally disposed between said electrodes, for separating oxygen and hydrogen gases produced by said electrolysis means;
  (f) compressor means mounted on said pilaster means, for compressing at least hydrogen gas separated by said gas separation means; and,
  (g) gas storage means for at least storing hydrogen gas, said storage means comprising at least a portion of said float means, said gas storage means being in fluid communication with the output of said compressor means.

2. The apparatus of claim 1, wherein said pilaster means comprises a hollow tubular member defining a hollow well portion, and wherein said electrodes are disposed below a predetermined low water line within said hollow well portion.

3. The apparatus of claim 2, wherein said gas separation means comprises a microporous barrier between said electrodes.

4. The apparatus of claim 3, wherein said hollow tubular member defines a head space and wherein said gas separation means comprises a baffling means for separating portions of said headspace of said well portion.

5. The apparatus of claim 4, wherein the compressor means compresses said hydrogen gas generated by said electrolysis means and transmits said compressed hydrogen gas to said float means.

6. The apparatus of claim 5, further comprising means for placing said well portion in liquid communication with said body of water at a location below said low water line.

7. The apparatus of claim 6, wherein said compressor means is powered by current produced by said generator means.

8. The apparatus of claim 6, wherein said compressor means is mechanically powered by the movement of said float means.

9. The apparatus of claim 6, wherein said liquid communication means comprises a plurality of apertures formed in said pilaster means.

10. The apparatus of claim 9, further comprising filtering means disposed in said pilaster means for filtering debris from water entering said well portion.

11. A wave-power collection apparatus for installation in a body of water, comprising:
  (a) a tubular member forming a hollow well therein, said tubular member having a first end attached to the floor of said body of water and a second end extending above the surface of said body of water, said hollow well in flow communication with said body of water, whereby said water fills at least a portion of said hollow well;
  (b) a toroidal float adapted for vertical movement along said tubular member in response to tidal and wave motion in said body of water;
  (c) a shaft mounted in said tubular member and means for converting said vertical movement of said float into rotation of said shaft;
  (d) a generator adapted to be driven by said rotation of said shaft and produce electrical current thereby; and
  (e) first and second electrodes mounted in said portion of said hollow well filled with said water and electrically coupled to said generator, said electrodes adapted to cause current to flow therebetween through said water.

12. The apparatus of claim 11 wherein said electrodes are adapted to dissociate a portion of said water through which said current flows, thereby producing hydrogen and oxygen, and further comprising a compressor for compressing said hydrogen.

13. The apparatus of claim 12 wherein said compressor is driven by said rotation of said shaft.

14. The apparatus of claim 12 wherein said compressor is driven by said electrical current produced by said generator.

15. The apparatus of claim 11 further comprising means for flooding said float with water from said body of water, said flooding means responsive to the level of said water filling said well.

16. The apparatus of claim 11 further comprising means for severing said electrical couple between said electrodes and said generator if the level of said water filling said well drops below a predetermined level.

17. The apparatus of claim 11 wherein said electrical couple severing means comprises logic means.

18. The apparatus of claim 17 wherein said electrical couple severing means further comprises level sensing means.

* * * * *